United States Patent [19]
Lingenfelter et al.

[11] 3,896,611
[45] July 29, 1975

[54] POWER TRANSMISSION BELT HAVING ATTACHED VEGETATION ENGAGING ELEMENTS AND METHOD

[75] Inventors: Guy E. Lingenfelter, Broomfield; William M. Haines, Englewood, both of Colo.

[73] Assignee: The Gates Rubber Company, Denver, Colo.

[22] Filed: June 8, 1973

[21] Appl. No.: 368,425

[52] U.S. Cl. ................................ 56/119; 56/291
[51] Int. Cl.² ................ A01D 45/02; A01D 55/24
[58] Field of Search .................. 56/291–293, 56/119; 74/231 R, 231 P, 234, 237; 156/137–139

[56] References Cited
UNITED STATES PATENTS

| | | | |
|---|---|---|---|
| 1,923,542 | 8/1933 | Keyes et al. | 74/231 R X |
| 1,935,817 | 11/1933 | Reynolds | 156/138 X |
| 2,637,436 | 5/1953 | Andrews | 56/119 X |
| 2,802,511 | 8/1957 | Waugh | 156/138 |
| 3,464,875 | 9/1969 | Brooks et al. | 156/138 |
| 3,545,188 | 12/1970 | Locati | 56/292 X |
| 3,561,202 | 2/1971 | Tupper | 56/291 |
| 3,641,751 | 2/1972 | Locati et al. | 56/291 |
| 3,759,112 | 9/1973 | Polshikov et al. | 74/231 R |
| 3,831,358 | 8/1974 | Marsh et al. | 56/291 |

*Primary Examiner*—J. N. Eskovitz
*Attorney, Agent, or Firm*—Curtis H. Castleman, Jr.; Raymond Fink; H. W. Oberg, Jr.

[57] ABSTRACT

An endless power transmission belt to which is attached a plurality of vegetation engaging elements, e.g. crop conveying or gathering lugs. Each element has a stem which extends downwardly through the belt body into a notch formed on the undersurface of the belt. A retention member such as a pin is firmly fastened to the stem within the compression section of the belt so as to firmly engage the element with the belt and yet permit the element and the belt at each notch to undergo limited relative movement about a pivot area transverse of the belt and formed at the upper portion of the notch. A method for fastening the crop engaging element to the belt is also described.

16 Claims, 22 Drawing Figures

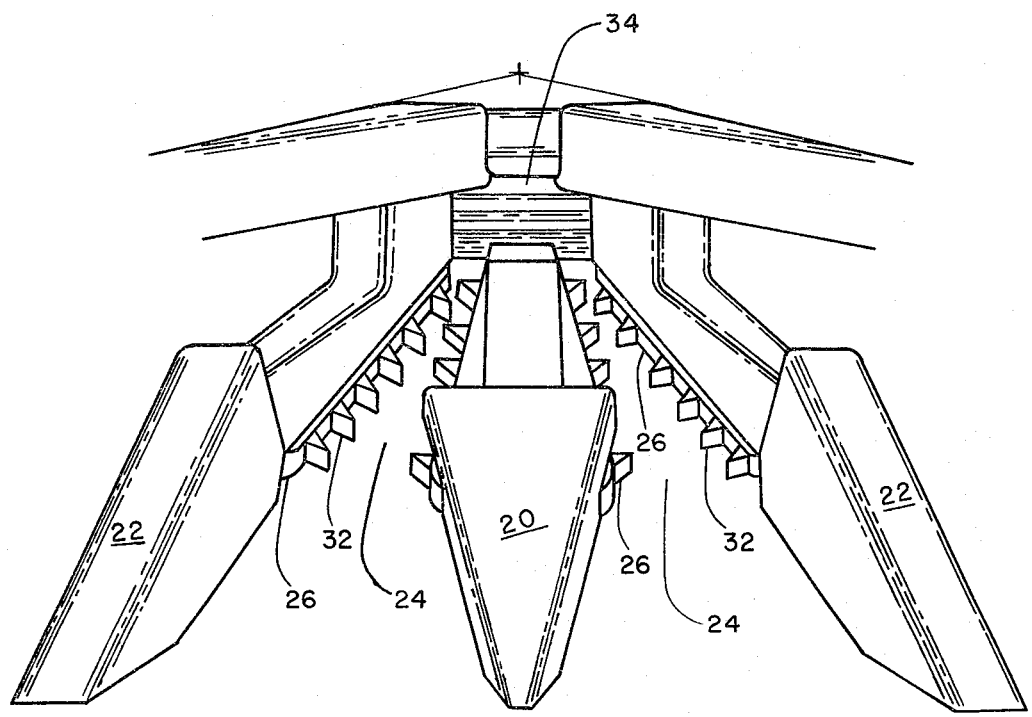
FIG. I
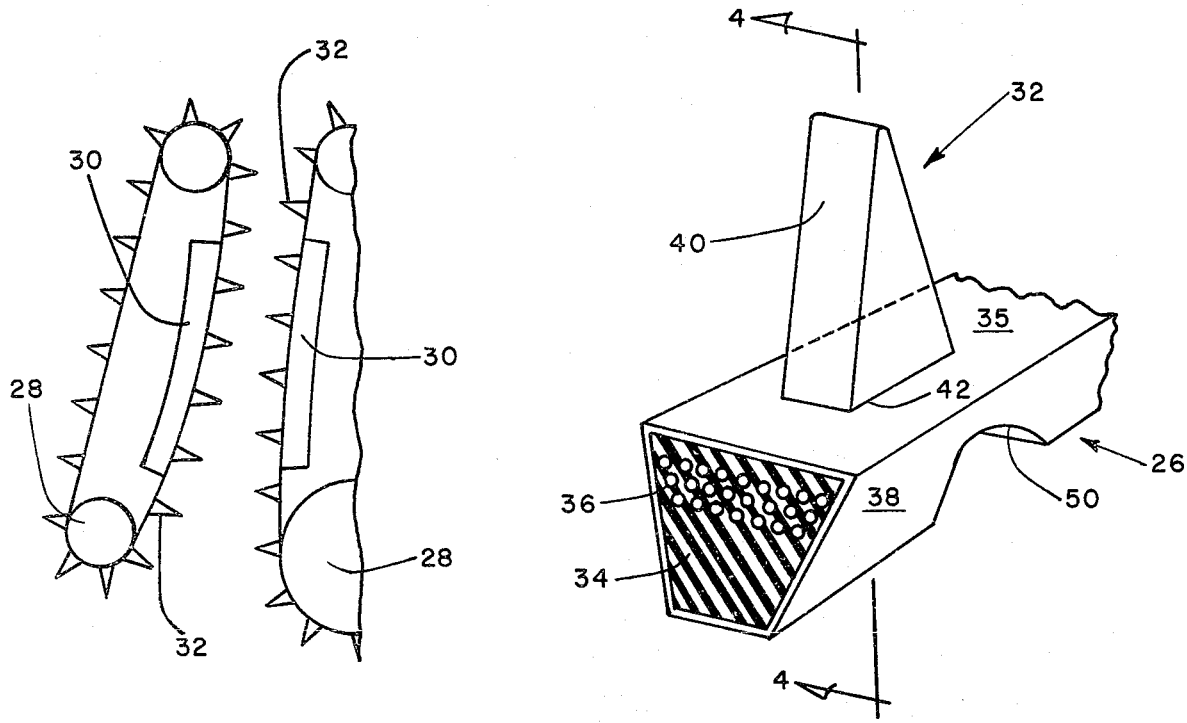
FIG. 1a
FIG. 2

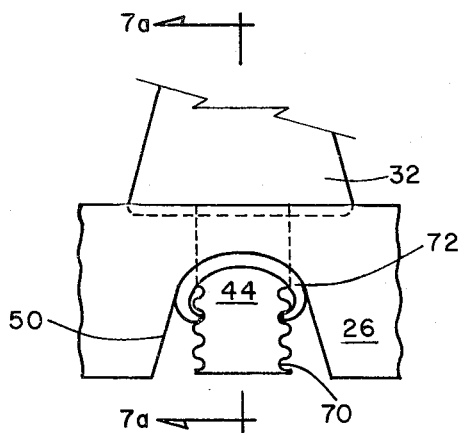
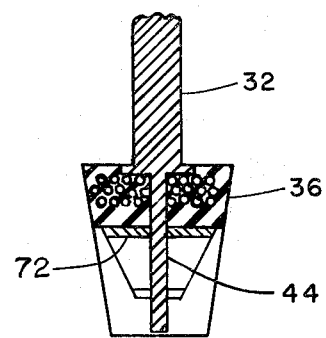
FIG. 7　　　　　FIG. 7a
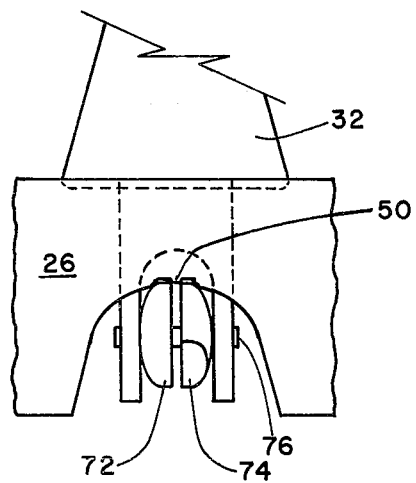
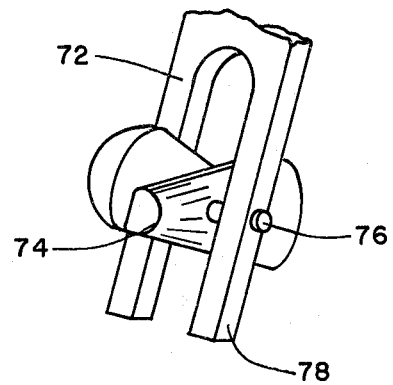
FIG. 8　　　　　FIG. 8a

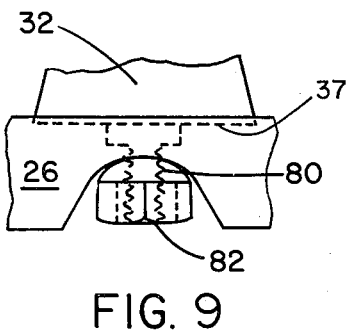
FIG. 9
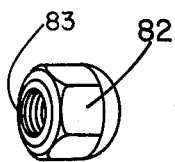
FIG. 9a
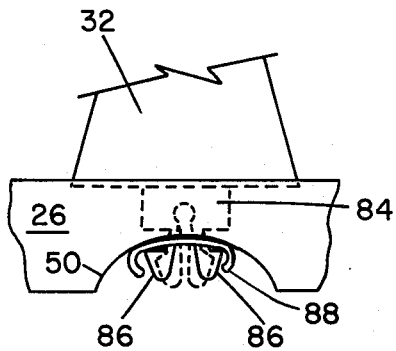
FIG. 10
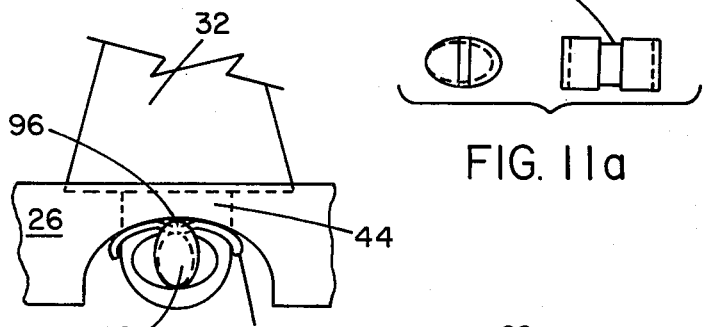
FIG. 11   FIG. 11a   FIG. 12
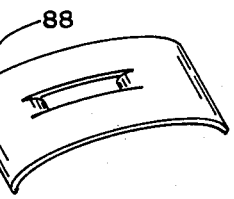
FIG. 10a
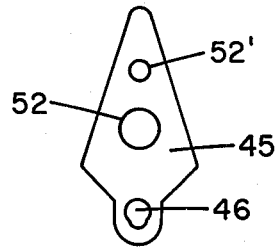
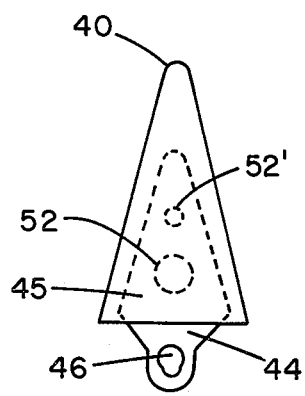
FIG. 13
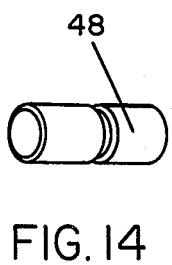
FIG. 14
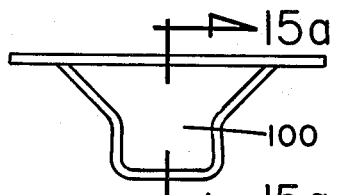
FIG. 15
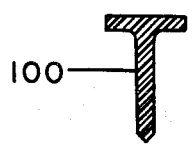
FIG. 15a

POWER TRANSMISSION BELT HAVING ATTACHED VEGETATION ENGAGING ELEMENTS AND METHOD

BACKGROUND OF THE INVENTION

This invention relates to power transmission belting having work elements attached to the belt for vegetation processing such as crop gathering, conveying or cutting.

Row crop harvesters typically include a forwardly positioned endless conveying means for channeling downed or standing crop to a cutting means and further processing. The conveying means generally includes at least one pair of juxtaposed endless positive drive means such as steel link chains having attached lugs adapted to engage the crops. The metallic chains are subject to wear and emit considerable noise during operation and when they become broken the severed chain parts damage processing equipment in the vicinity of the chain.

The cutting of vegetation has been successfully demonstrated using endless V-belts having attached therealong a plurality of cutter blades pivotally connected to a stem which is either embedded in the belt or biased against the undersurface of the belt. One conventional type of cutter belt has interposed between the cutter blade and the top surface of the belt below the aforementioned pivotal connection a compressed resilient pad (e.g. of urethane), permitting pivotal deflection of the cutter blade when subjected to impact shock loading, such as when a rock strikes the blade. Arrangements of this type are shown in Locati U.S. Pat. Nos. 3,545,188 and 3,651,626 and Hurlburt U.S. Pat. No. 3,699,757. In other cutter devices a notch on the underside of the belt has been employed to receive a curved semi-circular metal retention member which conforms substantially to the curvature of the notch but of a slightly smaller radius. In this embodiment the pivotal point is still at the upper surface of the belt. In another type, a pair of rivets longitudinally spaced along the belt extend radially through the undersurface to the top of the belt so as to fasten the cutter blade to the belt.

One of the drawbacks which has been prevalent with prior art cutter belts has been the occurrence of the so-called "chordal" effect which results when the belt rotates about a relatively small diameter sheave. In each of the above enumerated prior art embodiments the fastener embedded within or positioned on the underside of the belt is characterized by a portion of substantial length extending longitudinally of the belt. This longitudinal fastener portion is generally made of a relatively high modulus material such as metal, which produces an effective chord between the ends of its longitudinal extension as it traverses a small diameter sheave or pulley. The result during operation is a buckling or binding of the belt promoting flex fatigue failure as a result of stress concentrations at the ends of the chord.

It has also been a further drawback of most prior art cutter blades that on the average from four to five separate parts are required to complete the assembly. Also, in the case where the stem of the cutter is embedded within the body of the belt, complicated belt building techniques are required for fabrication.

SUMMARY OF THE INVENTION

The present invention has for its primary objects to overcome the drawbacks of the prior art, to provide a power transmission belt with vegetation engaging elements fastened thereon which is quiet in operation, simple in construction and with a minimum of parts, which will withstand shock loading and acute bending around sheaves with an even distribution of and minimization of stresses, a cutter belt which will have improved torsional stiffness for high speed operation, a crop gathering belt of improved design and operation, and a method for fastening the vegetation engaging elements to the belt for improved operation. More specifically, the power transmission belt of the invention includes an endless belt having a plurality of vegetation engaging elements protruding from the outersurface of the belt comprising a work element such as a knife edge, slat or a gathering lug. The work element comprises a longitudinally extending base from which a stem extends downwardly into the compression portion of the belt and which is positioned within a notch formed on the undersurface of the belt, the stem having at its lower portion a seat, such as a hole, within which is engaged a retention member, such as a pin. The retention member is fastened to the seat of the stem so as to place the belt section lying between the base portion of the work element and the retention member under substantial compression. This fastening configuration permits limited relative movement between the belt and vegetation engaging element about an effective pivot area transverse of the belt formed at the upper portion of the notch.

The invention also contemplates a method for fastening the vegetation engaging element to the power transmission belt within a notch formed in the compression section of the belt, the method including the steps of forming a longitudinal slot through the surface of the belt extending downwardly and penetrating the compression section; notching the underside of the belt thus intersecting the slot and defining a passageway radially through the belt section; inserting the crop engaging element so that the stem portion is embraced within the slot and its free end extends through the passageway into the notch; and, placing the belt sections adjacent the passageway under elevated compression of a predetermined amount and engaging a fastening member in the seat while maintaining the compression. In a preferred embodiment the dimensions of the stem of the vegetation engaging element are made less than the slot in the belt in a longitudinal direction to define a substantial clearance therebetween for improved limited rocking motion about the pivot area formed at the juncture of the notch and retention member.

BRIEF DESCRIPTION OF THE DRAWINGS

The invention will be more completely understood by reference to the accompanying drawings where like elements are denoted by the same numerals, and in which:

FIG. 1 is a perspective view of a portion of a harvester apparatus having juxtaposed gathering belts contructed according to the invention and which are shown in a modified partial plan view in FIG. 1a;

FIG. 2 is a perspective view showing a portion of a belt section having a protruding crop gathering lug;

FIGS. 7, 7a, 8, 8a, 9, 9a, 10, 10a, 11 and 11a show alternative fasteners;

FIG. 12 shows the stem of a crop engaging element;

FIG. 13 shows the stem of FIG. 12 embedded within a plastic crop engaging element;

FIG. 14 is a pin retention member useful with the embodiment of FIG. 13; and

FIGS. 15 and 15a depict views of an insert useful in molding a passageway within the belt according to the invention.

PREFERRED EMBODIMENTS OF THE INVENTION

Figures 3, 4:
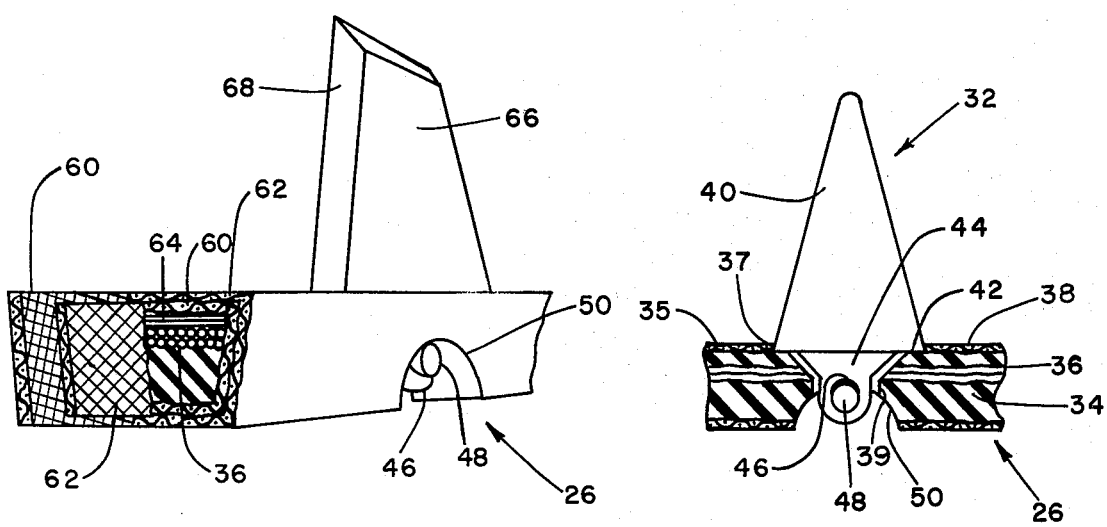
FIG. 3 is a view similar to FIG. 2 with the exception that a cutter belt with a cutting blade is shown.
FIG. 4 is an elevational partial sectional view taken along section 4—4 of FIG. 2.

Referring to the drawings and first to FIGS. 1 and 1a, the front portion of a typical two-row crop harvester is shown which typically may be used to harvest food or forage crops such as maize, milo, or soy beans. The forwardly extending gathering portions of the harvester include an inner fender segment 20 and a pair of outer fender segments 22 that rearwardly converge to define crop receiving passageways 24 bordered by juxtaposed and oppositely faced endless belt 26. The belts may be entrained around sheaves or pulleys 28 in a generally parallel or funneled fashion as shown in FIG. 1. In other types of harvesters as shown in FIG. 1a, the belts may be entrained about curved guide-bars 30 or alternatively a plurality of mounted pulleys so positioned that the gathering belt traverses the desired curved path.

Each of the belts carries a plurality of spaced gathering lugs or fingers 32, hereinafter described more fully, which channel downed or standing crop or other vegetation to a cutting means 34 or other element for further processing. Harvesters of this type as well as others may use the belt of the present invention.

Figure 5:
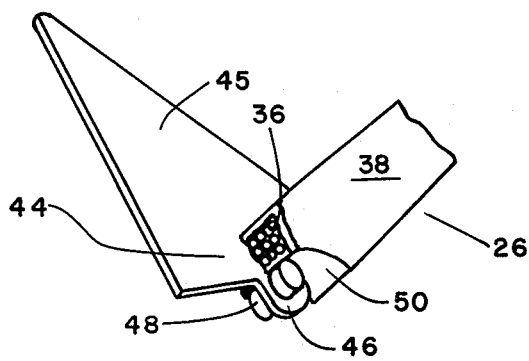
FIG. 5 is a cutaway perspective view focusing on the pivotal connection.

Referring to FIGS. 2, 4 and 5, a generally V or trapezoidal shaped power transmission belt having attached gathering lugs 32 is comprised of a polymeric body 34 of any suitable rubber or rubber-like material and in which is embedded a strain-resisting tensile section 36 consisting of a plurality of longitudinally extending tensile cords of textile material such as nylon, or polyester, or other suitably high modulus material such as steel cable. The belt carries a conventional outer fabric layer 38. The neutral axis of the belt (that section which is neither under tension or compression) coincides generally to the center-line of the tensile members or slightly below, creating a demarkation between the compression section, which is below the neutral axis, and the section which is operationally under tension above the neutral axis.

The gathering lug or finger 32 is comprised of an upper work portion 40, a base 42 and a stem 44 rigidly extending downwardly from the base. The stem terminates in a seat 46 which may carry a hole for receiving a retention member such as pin 48. The retention member 48 is biased against the underside and apex of notch 50 formed solely within the compression section of the belt and below the lowest disposed tensile member. Preferably the retention member is located well below the lowest disposed tensile member and most preferably between about one-fifth and two-fifths down from the neutral axis based on the total height of the compression section. At least a portion of the base 42 will be in intimate contact with the upper surface 35 of the belt, or as shown in FIG. 4 may be fitted within a slot 37 formed in the overcord of the belt above the tensile section.

The upper work portion, base and stem of the gathering finger may desirably be formed of a single material of high modulus, e.g. steel, although the stem and work element for instance may be formed of different materials affixed to one another. Thus, as shown stem 44 may desirably be made of a metallic material relatively thin in thickness with respect to the work element for nesting laterally into the body section of the belt thus permitting a desirable rocking action. The stem may be embedded within an impact and abrasion resistant molded plastic finger work portion 40 as shown in the embodiment of FIG. 4. In a preferred embodiment as shown in FIGS. 12 and 13, the stem has an upwardly extending portion 45 about which is molded the generally triangular work element 40. The embedding or molding operation is facilitated by apertures or holes 52, 52' which serve to securely embed the stem within the gathering finger and preclude relative movement.

It is a central feature of the invention that the retention member be engaged in the seat of the stem and biased against the apex of the notch with a sufficient force to place the belt section lying between the base 42 of the protruding element and the retention member such as pin 48 under substantial compression. This prestressing of the belt section which includes the tensile section, neutral axis and a portion of the compression section operates to transmit stresses imposed on the work element during dynamic operation directly into the strain-resisting members. This transmission of stresses effectively increases the modulus of the belt and greatly minimizes localized stress concentrations.

Figure 6:
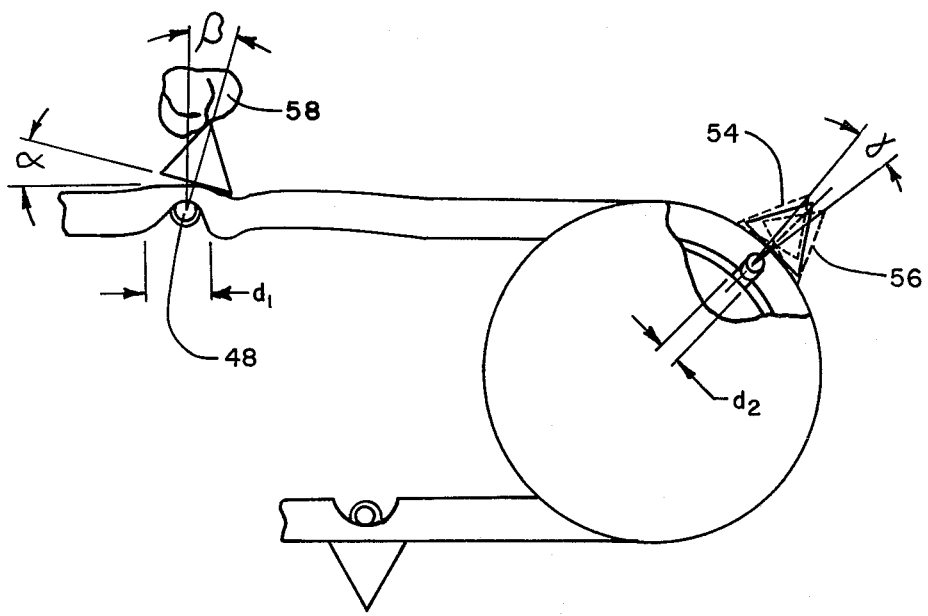
FIG. 6 shows a portion of the belt in operative association with a sheave.

It is a critical feature of the invention that there exists a side or longitudinal clearance between the retention member and the adjacent sides of the notch. Thus, in FIG. 4, for instance, the radius of the retaining pin is significantly less than the radius of the notch. In like manner, each of the alternative fastening means shown in FIGS. 7–11 has a retention member whose longitudinal dimension is less than that of the notch so as to provide a substantial clearance therebetween. The advantages of such clearance in all of the embodiments is apparent as the belt is trained about a relatively small diameter sheave, as shown in FIG. 6, whereby the compression section of the belt in the area of the notch is made to compress and intimately conform about the retention member. Thus, the normal base width $d_1$ of the notch may be reduced to a base width of $d_2$, as shown. It is this clearance between the retention member and sides of the notch which permits this intimate conformance and bending without buckling or occurrence of the aforementioned chordal effect characteristic of conventional gathering or cutter belts.

Another form of clearance contemplated by the invention is illustrated in FIG. 4. As shown, the slot 39 formed in the belt for receiving the stem of the gathering element is over-sized so that a substantial clearance, e.g. one-sixteenth inch exists longitudinally between the belt and the side edges of the stem 44. During the dynamic operation of the belt, this clearance permits the gathering element to undergo a limited rocking motion. Thus, the gathering element as shown in FIG. 6 when traversing a sheave may rock about the retention member from extreme positions 54 and 56 through an included angle of γ. Similarly, if the work element is subjected to shock loading exemplified by impact with rock 58 the work element may rock through angle β, while the base of the element with respect to the top surface 35 of the belt may undergo a deflection through angle α. While the clearance between the stem and the belt is important to permit rocking movement through a large angle, the natural resilience of the belt will also permit some rocking movement even without a significant clearance between elements. In this regard, the lower portion of the stem 44 in the area of seat 46 when traversing a sheave will actually plunge within or nest into the adjacent compression section of the belt due to its resiliency and further to the preferably limited thickness of the stem. In this manner, the dynamic action of the belt at the fastener connection is freely permitted even when traversing very small diameter sheaves.

It is a feature of the invention that the entire vegetation engaging element including the work element, stem and retention member pivot as a unit about a single effective pivot area which is transverse of the belt and formed at the upper portion or apex of the notch. In this manner, the above-mentioned limited rocking movement of the vegetation engaging element is permitted in conjunction with the defined clearances. Not only is the vegetation engaging element permitted a pivotal movement about the retention member within the compression section of the belt, as is shown in FIG. 6, but the belt is also permitted a relative pivotal movement about this effective pivot area with respect to the vegetation engaging element; this latter embodiment is illustrated by the rock or other foreign object contacting the vegetation engaging element and causing it to deflect through angle β while simultaneously the belt undergoes a deflection or undulation as shown. Preferably the pivot area (within the compression section of the belt) is in the bottom one-half of the entire belt cross section.

The foregoing description with regard to the vegetation gathering finger, which may be subjected to rotational speeds of about 800 ft/min. is also applicable in general to cutter elements such as shown in FIG. 3 which may undergo rotational speeds in the neighborhood of 9,000 ft/min. However, due to the much higher speeds of the cutting belt embodiment, certain features have been incorporated to improve torsional stiffness to minimize dynamic vibration and to reduce noise, as well as to resist dislodgement or tearing out of the cutter blade and its retention member from the body of the belt. To secure the desired torsional stiffness, at least two plies of torsionally stiff fabric layers 60, 62 are wrapped about the belt body 26. At least a portion of the fibers of either fabric layer are oriented obliquely with respect to other fibers in the same fabric layer or an adjacent fabric layer. Clearly, in general a plurality of fabric layers may be utilized depending on the amount of torsional stiffness desired for the particular application. The fabric layers 62 and 64 may be cut on a bias, and may be biased woven as well as square woven.

In combination with the additional fabric layer about the surface of the belt, it has been found that the provision of at least one layer of cording material 64 oriented transverse to the strain-resisting tensile members 36 is required to permit the belt to undergo very high rotational speeds without significant vibration. These cross-cords situated within the overcord of the belt are to be distinguished from mere fiber loading of the rubber compound used in the overcord or undercord of the belt which fail to provide necessary cross stiffness. The cross-cords according to the subject invention are preferably treated with a surface layer of latex or other adhesive impregnant which penetrate into the yarn forming the cord and provide intimate adhesive bond between the yarn and rubber body of the belt within which the cords are embedded. With this improved adhesion, the cross-cords directly absorb stresses imposed upon the belt and effectively dampen those stresses to minimize vibration.

In FIG. 3, the vegetation engaging element is similar to the crop gathering element previously described, except that the protruding element has an upper work portion 66 having a cutting or knife edge 68 at the leading edge of the cutter element. As described with regard to the gathering lug or finger 32, the cutter blade 66 is fastened to the belt under substantial compression and a single effective pivot area transverse of the belt is formed at the upper portion of the notch to permit limited relative movement between the belt and cutter element about the single pivot area.

Referring to alternative fastening means as shown in the drawings, in FIGS. 7 and 7a the stem or shank 44 of the gathering element 32 fits within a longitudinal slot in the V-belt. The lower extension of the shank protrudes within the notch 50 of the belt and is provided with a plurality of serrations 70. The fastening is accomplished by the use of slotted spring-steel clip 72 which fits about the shank 44. The free edges of the spring clip 72 positively engage the serrated teeth 70. The fastener is pushed in place by the use of a suitable tool such as appliance pliers which give a high compressive force to the belt cross-section between the base of the gathering finger and the top of the notch which maintains compression in the belt section during operation of the belt. The widened top surface of the clip 72 provides a broad bearing surface engaging the top of the notch lending stability during operation of the belt.

In another embodiment as shown in FIGS. 8 and 8a, a cuff-link fastener is used with a split cam toggle. The cams 72, 74 are mounted on a longitudinally extending pin 76 within a slot formed within fork 78 and aligned in opposite directions. The cams are rotated upwardly so as to apply pressure to the apex of the notch 50 putting the belt section under substantial compression.

In FIGS. 9 and 9a the fastener utilized is a combination of a threaded rectangular shank 80 receiving a round nose bolt 82. The bolt may have a nylon insert 83 or other conventional locking device to prevent unthreading of the bolt during operation.

In FIG. 10 a split shank stem 84 is shown having juxtaposed tapered leads 86 biasing a slotted tinnerman type clip 88 against the underside of the notch 50 so as to place the belt section under substantial compression. The spring characteristics of the split shank provide the locking force for the assembly. By compressing the tapered leads 86 inwardly and toward one another, the gathering element 32 may be disassembled from the fastening means.

FIG. 11 shows a gathering finger 32 having a downwardly extending shank 44 passing through a slotted retention clip 90. The lower extension of the stem carries an oval hole cross-wise to the length of the stem and in which an oval slotted cam pin 92 is inserted and turned 90° so that the outer portions of the slot 94 receive a pair of crimped portions 96 of the slotted clip 90. The belt section is maintained under compression.

In the method for fastening the vegetation engaging element to the belt, the longitudinal slot is formed in the belt so as to pierce the top surface of the belt and extend downwardly so as to penetrate the compression section. The slot may be formed by cutting a cured belt. However, for rather complex shaped slots or where uniformity is desired the invention contemplates custom molding a metal insert of desired shape such as shown in FIGS. 15 and 15a. The metal insert 100 is placed into the uncured belt core. This operation is followed by curing of the green belt having the embedded metal insert; the insert is then withdrawn thereby forming the desired slot. As described previously, it is preferred that the dimensions of the metal insert are greater in longitudinal breadth than the stem of the vegetation engaging element to create a substantial clearance between the elements.

Once the slot is formed in the upper surface of the belt extending into the compression section, the underside of the belt is notched solely within the compression section and in a manner to intersect the slot and define a passageway radially through the belt section. Again, this notch may be formed mechanically after the belt has been cured, or formed prior to curing so as to enable positioning of a fabric layer on the inner surface of the notch. Once the passageway is defined, the crop engaging element may be inserted so that the stem is embraced within the slot and its free lower end extends through the passageway and into the notch. The belt section between the notch and upper surface of the belt are then placed under elevated compression as previously described of a predetermined amount and while maintaining such compression the fastening member is engaged in the seat of the stem. The fastening member is thus firmly biased against the apex of the notch solely within the compression section of the belt.

It is a feature of the invention that the lowest portion of the stem containing the seat for the retention member is housed substantially completely within the notch. This feature permits the desired dynamic action provided by the compression section of the belt both during shock loading and for intimate conformance and bending of the undercord of the belt as it traverses small diameter sheaves.

The invention is capable of a variety of modifications and variations which will be become apparent to those skilled in the art, and which are to be included within the scope of equivalents afforded by the appended claims.

What is claimed is:

1. A power transmission belt for vegetation processing comprising:
    an endless belt operable in a longitudinal direction including a strain-resisting tensile section and a compression section having at least one transversely disposed notch therein and having attached at a plurality of spaced points along the outer surface of the belt vegetation engaging elements which individually comprise:
    a protruding element having an upper work portion and a base portion on the outer surface of the belt and a stem rigidly extending downwardly from the base portion of the work portion into the body of the belt below the tensile section of the belt;
    said stem having at its lower portion a seat positioned within said transversely disposed notch formed on the undersurface and solely within the compression section of said belt;
    a retention member engaged in the seat and biased against the upper portion of said notch with a force sufficient to place the belt section lying between said base portion of the protruding element and the retention member under substantial compression;
    said retention member having a longitudinal dimension small compared with that of the notch measured at its widest point at its opening with the undersurface of the belt, thereby defining a substantial clearance therebetween so as to permit substantially free flexing of the belt about the retention member;
    whereby during operation of the belt said vegetation element and said belt at each transverse notch are permitted to undergo limited relative movement about an effective pivot area transverse of the belt formed at the upper portion of the notch.

2. The power transmission belt of claim 1 wherein the stem fits in a slot in the body of the belt so dimensioned that clearance is provided between the stem and belt body in a direction longitudinally of the belt permitting a limited rocking motion of the vegetation engaging element about said pivot area when said element is subjected to loading.

3. The power transmission belt of claim 1 wherein said seat consists of a hole in which is engaged a slotted pin retention member extending transverse of and in intimate contact with the compression section of the belt.

4. The power transmission belt of claim 3 wherein the sides of the pin are longitudinally spaced away from adjacent side portions of the notch to permit flexure of the belt as it rotates about a cooperating grooved sheave surface.

5. The power transmission belt of claim 1 wherein at least one of said vegetation engaging elements is a cutter blade.

6. The power transmission belt of claim 5 characterized by improved torsional stiffness for high speed operation and resistance to dislodgement or tearing out of the cutter blade and its retention member comprising:
    at least two plies of torsionally stiff fabric layers forming the outer surface of said belt, at least a portion of the fibers of the fabric layers being oriented obliquely with respect to other fibers in the same or different fabric layer; and
    at least one fibrous layer just above the strain-resisting tensile section oriented substantially transversely of the belt and securely bonded to the belt.

7. The power tranmission belt of claim 6 wherein the outer fabric layers are torsionally stiff due to a thorough penetration into the layers of a resinous impregnant material which intimately contacts and stiffens the fibers.

8. The power transmission belt of claim 1 wherein at least one of said vegetation engaging elements is a gathering finger.

9. The power transmission belt of claim 1 wherein the upper work portion, base portion and stem are formed integrally of a single material of high modulus.

10. The power transmission belt of claim 8 wherein the stem has an integral portion extending upwardly from said downwardly extending portion, said upwardly extending portion forming a support for and being securely embedded within a molded plastic impact and abrasion resistant gathering finger work portion.

11. The power transmission belt of claim 1 wherein the pivot area is in the lower one-half of the cross section of the belt and below the tensile member.

12. The power transmission belt of claim 1 wherein said seat comprises depressions formed in the edges of said stem and said retention member comprises a slotted spring clip engageable within said depressions and biased against the upper portion of said notch formed in the compression section of the belt.

13. The power transmission belt of claim 1 wherein the lowest portion of the stem and the entirety of the retention member are housed substantially completely within said notch.

14. The power transmission belt of claim 1 wherein the base portion of the protruding element is in direct contact with the upper surface of the belt.

15. The power transmission belt of claim 1 wherein the belt is a V-belt.

16. In a harvesting apparatus, in combination therewith a power transmission belt for vegetation processing in conjunction with said harvesting apparatus, said belt comprises:

an endless belt operable in a longitudinal direction including a tensile section and a compression section at least a portion through which is intersected by at least one transversely disposed notch, and the belt having attached at a plurality of spaced positions along its outer surface vegetation engaging elements which individually comprise:

a protruding element having an upper work portion and base portion on the outer surface of the belt and a stem extending downwardly from the base portion of the work portion into the body of the belt below said tensile section;

said stem having at its lower portion a seat positioned within said transversely disposed notch;

a retention member engaged in the seat and biased against the upper portion of said notch;

said retention member having a longitudinal dimension small compared with that of the notch measured at its widest point at its opening with the undersurface of the belt, thereby defining a substantial clearance therebetween so as to permit substantially free flexing of the belt about the retention member.

* * * * *